United States Patent [19]

Arribart et al.

[11] Patent Number: 5,241,411
[45] Date of Patent: Aug. 31, 1993

[54] ELECTROCHROMIC VARIABLE TRANSMISSION GLAZING

[75] Inventors: Hervé Arribart, Soisy sous Montmorency; Bernard Buffat, Paris; Christian Padoy, Gonesse; Véronique Reboul-Salze, Mery sur Oise, all of France

[73] Assignee: Saint-Gobain Vitrage, Courbevoie, France

[21] Appl. No.: 859,598

[22] Filed: Mar. 23, 1992

Related U.S. Application Data

[63] Continuation of Ser. No. 328,369, Mar. 24, 1989, abandoned, which is a continuation-in-part of Ser. No. 69,467, Jul. 2, 1987, Pat. No. 4,844,591.

[30] Foreign Application Priority Data

Mar. 25, 1988 [FR] France ................. 88 03940

[51] Int. Cl.$^5$ ................. G02F 1/153; G02F 1/15
[52] U.S. Cl. ................. 359/269; 359/265; 359/270
[58] Field of Search ................. 350/357; 359/265, 269, 359/270

[56] References Cited

U.S. PATENT DOCUMENTS

| | | | |
|---|---|---|---|
| 3,708,220 | 1/1973 | Meyers et al. | 350/160 R |
| 3,951,521 | 4/1976 | Findl | 350/160 R |
| 4,220,514 | 9/1980 | Duchene et al. | 204/192 P |
| 4,258,984 | 3/1981 | Beni et al. | 350/357 |
| 4,278,329 | 7/1981 | Matsuhiro et al. | 350/357 |
| 4,309,083 | 1/1982 | Duchene et al. | 350/357 |
| 4,338,000 | 7/1982 | Kamamori et al. | 350/357 |
| 4,344,674 | 8/1982 | Giglia | 350/357 |
| 4,451,498 | 5/1984 | Hashimoto et al. | 427/38 |
| 4,465,339 | 8/1984 | Baucke et al. | 350/357 |
| 4,505,538 | 3/1985 | Toussaint et al. | 350/357 |
| 4,573,768 | 3/1986 | Polak et al. | 350/357 |
| 4,630,893 | 12/1986 | Credelle et al. | 350/334 |
| 4,652,090 | 3/1987 | Uchikawa et al. | 350/357 |
| 4,664,934 | 5/1987 | Ito et al. | 427/38 |
| 4,790,636 | 12/1988 | Carlson | 350/357 |
| 4,844,591 | 7/1989 | Arribart et al. | 350/357 |
| 4,902,109 | 2/1990 | Kawate et al. | 359/900 |

FOREIGN PATENT DOCUMENTS

| | | |
|---|---|---|
| 0001955 | 5/1978 | European Pat. Off. . |
| 0028147 | 5/1981 | European Pat. Off. . |
| 2606220 | 10/1986 | France . |
| 0253713 | 7/1987 | France . |
| 60-151616 | 1/1984 | Japan . |
| 63-018335 | 7/1986 | Japan . |
| 2005856 | 4/1979 | United Kingdom . |

OTHER PUBLICATIONS

S. F. Cogan, et al., "Solar Modulation in Complementary Electrochromic Windows", *Solar Energy Materials* 16 (1987) 371–382.

(List continued on next page.)

*Primary Examiner*—Bruce Y. Arnold
*Assistant Examiner*—Evelyn A. Lester
*Attorney, Agent, or Firm*—Pennie & Edmonds

[57] ABSTRACT

An electrochromic variable transmission glazing comprising first and second glass sheets substrates which are joined by an organic polymer whose proton conductivity is greater than or equal to $10^{-5}$ ohm$^{-1}$ cm$^{-1}$ at 20° C. The glass sheets are coated on their joining faces with transparent electroconductive layers. The first transparent substrate further comprises a layer of electrochromic material, such as tungsten oxide, in contact with the proton conductive polymer. The glazing is characterized by an iridium oxide layer on the second transparent substrate which is interposed between the layer of electroconductive material and the organic polymer. The glazing further comprises a pair of current leads attached to the electroconductive layer which connect the glazing to a generator.

32 Claims, 1 Drawing Sheet

OTHER PUBLICATIONS

Schiavone, et al., "Electrochromic iridium oxide films prepared by reactive sputtering", *Appl. Phys. Lett.* 35(10) Nov. 15, 1979 p. 823.

Shay, et al.; "Electrochromism of anodic iridium oxide films on transparent substrates", *Appl. Phys. Lett.* 33(11) Dec. 1, 1978, p. 942.

Giglia and Haacke, "Performance Improvements of $WO_3$-Based Electrochromic Displays", 23 Proceedings of the SID (1982), p. 41.

Siefert, "Properties of Thin $In_2O_3$ and $SnO_2$ Films Prepared By Corona Spray Pyrolysis and a Discussion of the Spray Pyrolysis Process", 121 Thin Solid Films (1984) pp. 275–282.

Rauh, et al. "Materials for Electrochromic Windows", SPIE vol. 502 Optical Materials Tech. for Energy Efficiency and Solar Energy Conversion III (1984) p. 38.

Svensson, et al. "Electrochromic Coatings for 'Smart Windows'", SPIE vol. 502 Optical Materials Tech. for Energy Efficiency and Solar Energy Conversion III (1984) p. 30.

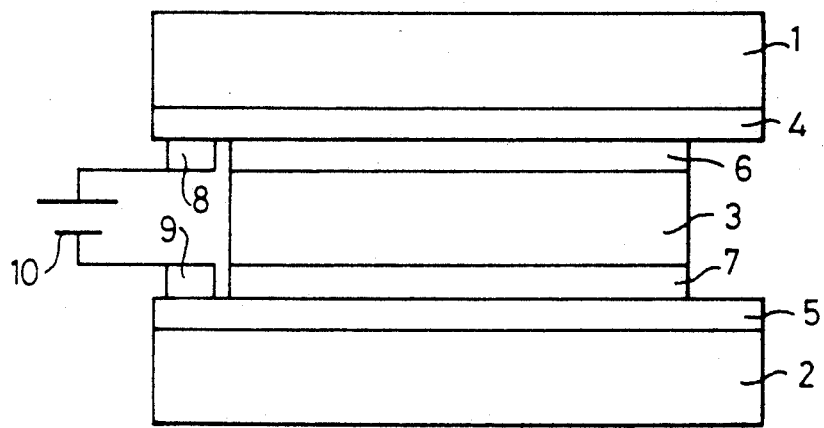
FIG_1

ELECTROCHROMIC VARIABLE TRANSMISSION GLAZING

CROSS REFERENCE TO RELATED APPLICATIONS

This application is a continuation of application Ser. No. 07/328,369, Mar. 24, 1989, now abandoned, which was a continuation-in-part of application Ser. No. 07/069,467, filed Jul. 2, 1987, now U.S. Pat. No. 4,844,591.

TECHNICAL FIELD

The invention relates to a variable transmission glazing of the electrochromic type and more specifically to a laminated glazing whose light transmission is modified by applying an electric potential difference.

BACKGROUND ART

U.S. Pat. application Ser. No. 4,884,591 describes a glazing with variable light transmission by application of an electric potential difference successively comprising a first glass sheet, a transparent electroconductive layer, for example, with a base of indium oxide doped with tin, a layer of tungsten oxide—a transparent material which takes on a night blue coloring by insertion of protons—, an electrolytic layer consisting of a proton-conductive organic material particularly of the type of a solution of a strong acid in an organic polymer, a second electroconductive layer and finally another glass sheet. This type of glazing can be obtained starting from proven techniques of the glass transformation industry. Such techniques include depositing thin films by reactive sputtering assisted by a magnetic field and the techniques of laminating by autoclave sealing. Consequently these glazings can be prepared at costs comparable with consumer products and in large surfaces on the order of a square meter or more. The applications considered for electrochromic glazings, however, are most often limited to watch and clock displays and to precision optical techniques.

The life of such electrochromic systems, however, is very short, since microbubbles, probably due to the formation of hydrogen, appear after a few dozen operating cycles. These microbubbles are troublesome because, in a closed system such as a laminated glazing, they can be eliminated only by exchange with the ambient air.

A notable improvement to the system described above includes the insertion of a counterelectrode that can accept protons during the fading phase and release them during the coloring phases. U.S. Pat. No. 4,844,591 proposes to use a palladium layer as a counterelectrode. This layer is deposited by metallization by high-vacuum evaporation. Under these conditions the life of the system is increased by about a factor of 10. To be effective, however, the palladium layer should have a thickness greater than 10 nanometers. Under these conditions though, the light transmission of the glazing is always less than 15%, which is insufficient, for example, for a building glazing.

On the other hand, U.S. Pat. No. 4,350,414 discloses a completely solid electrochromic system consisting of stacking a series of thin layers on a transparent substrate. For example, stacking on a glass substrate: a transparent first conductive layer; a layer of electrochromic material of the tungsten oxide type; a dielectric layer of tantalum pentoxide; a layer of iridium and/or of nickel hydroxide deposited in the presence of water vapor; and a second transparent conductive layer. Insertion of a 50 to 5000 angstroms iridium hydroxide layer notably improves the variation of the optical density of the system. Optical density equals the logarithm of the ratio of the transmissions before coloring and after coloring. In other words, the iridium hydroxide layer contributes to a better contrast. However, such a system is very fragile since the last deposited layer is apparent. The system, therefore, can only be used in a unit protected by encapsulation, such as a watch or another display device. Besides, such completely solid systems are often the site of short circuits due to the presence of holes or cracks in the dielectric layer as indicated in the cited patent for tantalum pentoxide layers greater than 5 microns. Of course, the probability of a discontinuity of the layer is greater the larger the deposit surface. Thus in practice such a system can function only by choosing glass plates of very small dimensions, generally on the order of a square centimeter, and therefore is not compatible with large-surface applications.

SUMMARY OF THE INVENTION

The present invention relates to glazings for buildings and for motor vehicles, and more particularly to glazings for sliding glass sun roofs in passenger vehicles with controlled variation of the light transmission by an electric command. This glazing will have a life compatible with that of an ordinary glazing, i.e., not exhibiting degradation of its appearance after a considerable number of coloring/fading cycles.

The electrochromic variable transmission glazing of the present invention comprises two transparent substrates joined by an organic polymer. In a preferred embodiment, the transparent substrates are glass sheets and the organic polymer has a proton conductivity greater than or equal to $10^{-5}$ ohm$^{-1}$ cm$^{-1}$, at 20° C. The joining faces of the glass substrates are coated with transparent electroconductive layers. One of the glass substrates is further coated with a layer of electrochromic material, in contact with the proton conductive polymer which is preferably tungsten oxide. An iridium oxide layer is deposited on the second transparent substrate in contact with the proton conductive polymer. This iridium oxide layer acts as a counterelectrode to the layer of electrochromic material with a base of tungsten oxide. Actually, the iridium oxide layer receives the liberated protons in the fading phase and restores them in the coloring phase, therefore, the proton conductive polymer acts essentially as a proton transfer medium. Thus, the phenomenon of recombination of protons is greatly limited with, as a corollary, a reduction of the risk of formation of hydrogen molecules.

One particular advantage gained by the interposition of the iridium oxide layer is the considerable increase to the life of the glazing. The increased performance allows the glazing to undergo more than 20,000 coloring-/fading cycles without any degradation of appearance. This corresponds, for example, to 6 uses daily for 10 years. The glazing is therefore perfectly suited for use as a so-called "intelligent" glazing, to better control the heat input as a function of insolation.

Preferably the iridium oxide layer is deposited by cathode sputtering with an iridium target in the presence of low oxygen and hydrogen pressure. The percentage of hydrogen in the mixture is preferably between 10 and 30% and the thickness of the layer is preferably between 200 and 1000 angstroms.

The transparent electroconductive layers which are deposited on the transparent substrates are preferably glass sheets from about 1 to 6 mm thick. Preferably these layers are conductive, having a resistance of less than 10 ohms per square and preferably less than or equal to 5 ohms per square. The greater the dimensions of the glazing, the more advantageous it is to operate with layers with small restitivities. For example, layers with a base of tin oxide doped with fluorine or a base of indium oxygen doped with tin are suitable as electroconductive layers. These layers can be deposited by powder pyrolysis or cathode sputtering, which may or may not be assisted by a magnetic field.

According to the invention, a proton conductive polymer, whose proton conductivity at is greater than or equal to $10^{-5}$ ohms$^{-1}$ cm at 20° C., is used as an electrolyte. The selection criteria for such a polymer are defined in U.S. Pat. No. 4,844,591 which is incorporated herein by reference. Preferably, a phosphoric acid-poly(oxyethylene) complex is used having an O/H ratio of the number of oxygen atoms of the polymer to the number of hydrogen atoms of the acid between about 0.2 to 1. The molecular weight of the poly(oxyethylene) is preferably between 1,000,000 and 5,000,000.

The layer of electrochromic material preferably has a tungsten oxygen base, although other oxides, particularly vanadium or molybdenum oxide, known for their electrochromic character, could also be used. The electrochromic material is deposited on the transparent substrate which has been coated with a transparent electroconductive layer by metallization by high-vacuum evaporation. Or the material may be deposited by cathode sputtering optionally assisted by a magnetic field.

BRIEF DESCRIPTION OF THE DRAWING

The nature, advantages and various other additional features of the invention will appear more fully upon consideration of the illustrative embodiments now to be described in detail in connection with the accompanying drawing figures, wherein:

FIG. 1 is a cross-sectional view of the glazing according to the invention.

DETAILED DESCRIPTION OF THE PREFERRED EMBODIMENT

Referring now to FIG. 1, there is illustrated a laminated glazing comprising two glass sheets 1, 2 joined by an organic polymer 3. Glass sheet 1 is coated with a transparent electroconductive layer 4 forming a first electrode. Likewise, glass sheet 2 is coated with a transparent electroconductive layer 5 forming the second electrode. Further, glass sheet 1 comprises a layer 6 of electrochromic material in contact with organic layer 3, while glass sheet 2 comprises an iridium oxide layer 7, on the other side of organic layer 3. Electroconductive layers 4 and 5 are provided with current leads 8 and 9 connected to a generator 10.

The characteristics of these layers according to the best mode of the invention are as follows: (a) substrates (1 and 2) are float glass sheets having a thickness of about 3 mm; (b) transparent electroconductive layers (4 and 5) are indium oxide layers doped with tin having a resistance of about 5 ohms which are deposited by magnetron cathode sputtering to a thickness of about 400 nanometers (nm); (c) electrochromic layer (6) is a tungsten oxygen layer which is deposited by metallization under high-vacuum evaporation in a crucible having air pressure of $5 \times 10^{-5}$ torr, to a thickness of about 260 nm; (d) electrolyte (organic polymer 3) is a solid solution of anhydrous phosphoric acid in poly(oxyethylene); and (e) iridium oxide layer (7) is layer deposited by cathode sputtering assisted by a magnetic field, under a pressure of 6 millitorrs of an oxygen/hydrogen gas mixture (in 80-20 ratio), to a thickness of about 55 nm.

Referring to the preparation of organic polymer, a phosphoric acid (17.5 g) standard pure and poly(oxyethylene) with a molecular weight equal to 5,000,000 (density 1.21, glass transition temperature −40° C., O/H ratio of the number of oxygen atoms of the polymer to the number of hydrogen atoms of the acid equal to 0.66) are dissolved per liter of solvent under rigorous anhydrous conditions. The common solvent is, for example, a 50-50 mixture of acetonitrile and tetrahydrofuran. The solution is poured on a glass plate coated with a tungsten oxide layer deposited as indicated above. The uniform thickness is obtained by the wire puller method. Pouring is performed under an atmosphere with a controlled degree of moisture. After evaporation of the solvent, a 50-micrometer film is obtained whose conductivity is $9$-$10^{-5}$ ohm$^{-1}$ cm$^{-1}$ at 20° C., and whose light transmission is greater than 85%. The degree of moisture at the time of pouring should preferably be between 40 and 100 ppm, which makes it possible to obtain an optimal contrast later.

Preferably, the organic layer is deposited on the tungsten oxide layer shortly after deposit of the latter. Assembly of the glazing is performed in an autoclave at a temperature of 85° C., under a pressure of 10 kg/cm$^2$.

The performances are indicated below in Table 1 wherein the first values are obtained during coloring and the second values in the faded state:

TABLE 1

| life | more than 20,000 cycles |
| --- | --- |
| switching time | less than 20 seconds |
| supply voltage | 1.5 volts during coloring |
|  | 0.6 volt during fading |
| light transmission | 15%-62% |
| energy transmission | 11%-48% |
| solar factor | 31%-58% |
| light reflection | 10%-12% |
| energy reflection | 12%-12% |
| color during transmission | night blue colored state |
|  | neutral faded state |

A second preferred embodiment relates to a glazing made substantially as described above, except that the tungsten oxide layer is deposited by reactive cathode sputtering assisted by a magnetic field. This second deposition technique is preferred since it allows for the use of the same equipment for depositing the iridium layer. The deposition conditions are listed below in Table 2.

TABLE 2

| target | tungsten |
| --- | --- |
| atmosphere | 93% argon - 7% oxygen |
| pressure | 70 m torr |
| power | 0.8 watt/cm$^2$ |
| WO$_3$ thickness | 350 nm |

The performances obtained then are shown in Table 3.

TABLE 3

| | |
|---|---|
| switching time | less than 20 seconds |
| supply voltage | 1.5 volts during coloring |
| | 0.5 volt during fading |
| light transmission | 10%–55% |
| light reflection | 11%–12% |
| color during | night blue colored state |
| transmission | neutral faded state. |

After 10,000 cycles, the glazing does not exhibit any alteration of its performances.

Such a glazing can be used as a building glazing or as an automobile glazing, particularly for side windows or the back glass. The glazing is also particularly suited for use as a sliding sunroof, allowing the passengers of the vehicle to control the light transmission of the glazing at will, particularly as a function of insolation.

While it is apparent that the invention herein disclosed is well calculated to fulfill the objects above stated it will be appreciated that numerous modifications and embodiments may be devised by those skilled in the art, and it is intended that the appended claims cover all such modifications and embodiments as fall within the true spirit and scope of the present invention.

What is claimed is:

1. An electrochromic variable transmission glazing comprising: first and second transparent substrates joined by an organic polymer having a proton conductivity greater than or equal to $10^{-5}$ ohm$^{-1}$ cm$^{-1}$ at 20° C., each of said transparent substrates having an electroconductive layer coated on one face thereof facing said polymer, said first transparent substrate further comprising a layer of an electrochromic material between said electroconductive layer and said organic polymer, and said second transparent substrate further comprising a layer of a material which acts as a counterelectrode between said electroconductive layer and said organic polymer, said counterelectrode comprising protonated iridium oxide deposited by cathode sputtering in the presence of hydrogen and oxygen, and said glazing further comprising a pair of current leads connecting the layers of said substrates to a generator wherein current passing through said layers and said polymer causes said glazing to change color.

2. The glazing of claim 1 wherein said first and second transparent substrates are glass sheets.

3. The glazing of claim 1 wherein said organic polymer comprises a solid solution of anhydrous phosphoric acid in poly (oxyethylene) with a molecular weight between 1,000,000 and 5,000,000, and a ratio of the number of oxygen atoms of the polymer to the number of hydrogen atoms of the acid between about 0.4 and 1.

4. The glazing of claim 1 wherein the resistance of each electroconductive layer is less than 10 ohms per square.

5. The glazing of claim 4 wherein said electroconductive layers comprise indium oxide doped with tin which is deposit on said substrates to a thickness of about 400 nm.

6. The glazing of claim 1 wherein said electrochromic material is a tungsten oxide layer deposited on the electroconductive layer of said first substrate to a thickness of about 260 nm.

7. The glazing of claim 6 wherein said counterelectrode comprises a layer of iridium oxide deposited on the electroconductive layer of said second substrate to a thickness between about 200 and 1,000 angstroms.

8. A method for making an electrochromic variable transmission glazing comprising:
coating one face of first and second transparent substrates with a transparent electroconductive layer thereupon;
coating the electroconductive layer of said first transparent substrate with a layer of electrochromic material;
coating the electroconductive layer of said second transparent substrate with a counterelectrode material layer by depositing protonated iridium oxide by cathode sputtering in the presence of hydrogen and oxygen;
joining said substrates by an organic polymer placed between the electrochromic layer of said first transparent substrate and the counterelectrode of said second substrate, wherein said organic polymer has a proton conductivity greater than or equal to $10^{-5}$ ohm$^{-1}$ at 20° C.; and
connecting said electroconductive layers of said transparent substrates to a generator by a pair of current leads attached thereto.

9. The method of claim 8 wherein said first and second transparent substrates are glass sheets.

10. The method according claim 9, which comprises applying a transparent electroconductive layer having a resistance of less than 10 ohms per square to said transparent substrates.

11. The method according to claim 10 which comprises applying transparent electroconductive layers have a base of indium oxide doped with tin.

12. The method of claim 10 which comprises applying electroconductive layers having a base of tin oxide doped with fluorine.

13. The method according to claim 8 wherein the proton conductive polymer is a solid solution of anhydrous phosphoric acid in poly(oxyethylene) with a molecular weight between 1,000,000 and 5,000,000, and a ratio of the number of oxygen atoms of the polymer to the number of hydrogen atoms of the acid between 0.4 and 1.

14. The method according to claim 8 wherein said layer of electrochromic material is a tungsten oxide layer applied to the electroconductive layer of said first transparent substrate deposited by reactive sputtering assisted by a magnetic field.

15. The method according to claim 8 wherein said layer of electrochromic material is a tungsten oxide layer applied to the electroconductive layer of said first transparent substrate by metallization by vacuum evaporation.

16. The method according to claim 8 wherein said counterelectrode layer comprises applying a layer of iridium oxide to the electroconductive layer of said second transparent substrate by reactive sputtering assisted by a magnetic field from a metal iridium target in an oxygen/hydrogen gas mixture.

17. The method according to claim 16 wherein the iridium oxide layer is applied to a thickness of between 200 and 1,000 angstroms.

18. A method for changing the color of a glazing which comprises supplying an electric current to the glazing of claim 1 in an amount sufficient to cause said glazing to change color.

19. A method for changing the color of a glazing which comprises making a glazing according to the method of claim 8; and supplying an electric current to the glazing in an amount sufficient to cause said glazing to change color.

20. An electrochromic variable transmission glazing comprising: first and second transparent glass sheet substrates joined by an organic polymer having a proton conductivity greater than or equal to $10^{-5}$ ohm$^{-1}$ cm$^{-1}$ at 20° C., each of said transparent substrates having an electroconductive layer coated on one face thereof facing said polymer, said first transparent substrate further comprising a layer of a cathodic electrochromic material of tungsten trioxide between said electroconductive layer and said organic layer, and said second transparent substrate further comprising a counterelectrode comprising a layer of iridium copolymer; wherein said organic polymer comprises a substantially anhydrous solution of an inorganic acid in poly(oxyethylene), and said glazing further comprising a pair of current leads connecting the electroconductive layers of said substrates to a generator, wherein current passing through said layers and said polymers causes said glazing to switch between a neutral faded state and a colored state.

21. The glazing of claim 20, wherein said cathodic electrochromic material is selected from the group of tungsten oxide, vanadium oxide and molybdenum oxide.

22. The glazing of claim 20, wherein said counterelectrode of iridium oxide is deposited on the electroconductive layer of said second substrate to a thickness of between about 200 and 1000 Angstroms.

23. The glazing of claim 18, wherein said organic polymer comprises a solid solution of anhydrous phosphoric acid in poly(oxyethylene) with a molecular weight between 1,000,000 and 5,000,000 and a ratio of the number of oxygen atoms of the polymer to the number of hydrogen atoms of the acid between about 0.4 and 1.

24. The glazing of claim 20, wherein the resistance of said electroconductive layer is less than 5 ohms per square.

25. The glazing of claim 20, wherein the electroconductive layers each comprise indium oxide doped with tin deposited on said substrates to a thickness of about 400 nm.

26. A method for making an electrochromic variable transmission glazing comprising:

coating one face of each of first and second transparent substrates with a transparent electroconductive layer thereupon,
coating the electroconductive layer of said first transparent substrate with a layer of a cathodic electrochromic material,
coating the electroconductive layer of said second transparent substrate with a counterelectrode comprising a layer of protonated iridium oxide applied by reactive sputtering assisted by a magnetic field from a metal iridium target in an atmosphere of an oxygen/hydrogen gas mixture, said iridium oxide layer having a thickness of between about 200 and 1000 Angstroms;
joining said substrates by an organic polymer having a proton conductivity greater than or equal to $10^{-5}$ ohm$^{-1}$ cm$^{-1}$ at 20° C., wherein said polymer is placed between the cathodic electrochromic layer of said first transparent substrate and the counterelectrode of said second substrate, and
connecting the electroconductive layers of said transparent substrates to a generator by a pair of current leads attached thereto.

27. The method according to claim 26, wherein said first and second transparent substrates are glass sheets and which further comprises applying a transparent electroconductive layer having a resistance of less than 5 ohms per square to said sheets.

28. The method according to claim 26, which further comprises applying a transparent electroconductive layer having a base of indium oxide doped with tin to said transparent substrates.

29. The method according to claim 26, which comprises applying an electroconductive layer having a base of tin oxide doped with fluorine to said transparent substrates.

30. The method according to claim 26, which further comprises selecting the proton conductive polymer to be a solid solution of anhydrous phosphoric acid in poly (oxyethylene) with a molecular weight between 1,000,000 and 5,000,000 and a ratio of the number of oxygen atoms of the polymer to the number of hydrogen atoms of the acid between 0.4 and 1.

31. The method according to claim 26, wherein said layer of cathodic electrochromic material is a tungsten oxide layer and is deposited by reactive sputtering assisted by a magnetic field.

32. The method according to claim 26, wherein said layer of cathodic electrochromic material is a tungsten oxide layer and is deposited by vacuum evaporation.

* * * * *